United States Patent [19]
Schmitt

[11] Patent Number: 4,491,202
[45] Date of Patent: Jan. 1, 1985

[54] DISC BRAKE ASSEMBLY FOR VEHICLES WITH INTERCHANGEABLE BRAKE MODULES

[75] Inventor: Michel Schmitt, Fresnes, France

[73] Assignee: Lucas Industries public limited company, Birmingham, England

[21] Appl. No.: 395,478

[22] Filed: Jul. 6, 1982

[30] Foreign Application Priority Data

Aug. 25, 1981 [FR] France .................. 81 16207

[51] Int. Cl.³ .................. F16D 65/54; F16D 55/00
[52] U.S. Cl. .................. 188/71.5; 188/71.6; 188/72.3; 188/170
[58] Field of Search .................. 188/71.5, 71.6, 72.3, 188/264 D, 264 R, 170; 192/70.13, 85 AA, 18 A, 12 C

[56] References Cited

U.S. PATENT DOCUMENTS

| | | | |
|---|---|---|---|
| 2,372,123 | 3/1945 | Sadler | 192/85 AA |
| 3,010,543 | 11/1961 | Pear | 188/71.5 |
| 4,173,269 | 11/1979 | Craig | 188/71.5 |

FOREIGN PATENT DOCUMENTS 1572153 7/1980 United Kingdom .................. 188/70

Primary Examiner—Bruce H. Stoner, Jr.
Assistant Examiner—Alvin E. Oberley
Attorney, Agent, or Firm—Scrivener Clarke Scrivener and Johnson

[57] ABSTRACT

A brake particularly suitable for operation under heavy load and adapted to be mounted at the end of the axle of a vehicle, inside a rim of a wheel thereof, adjacent to speed-reducing gearing itself housed in the normal way in said rim. The brake comprises a plurality of elementary distinct interchangeable modules each enclosed by a housing and operating by interengagement of interleaved discs capable of axially sliding one relative to another under the action of a suitable braking control, these discs being cooled by a liquid circulating in a closed circuit.

10 Claims, 8 Drawing Figures

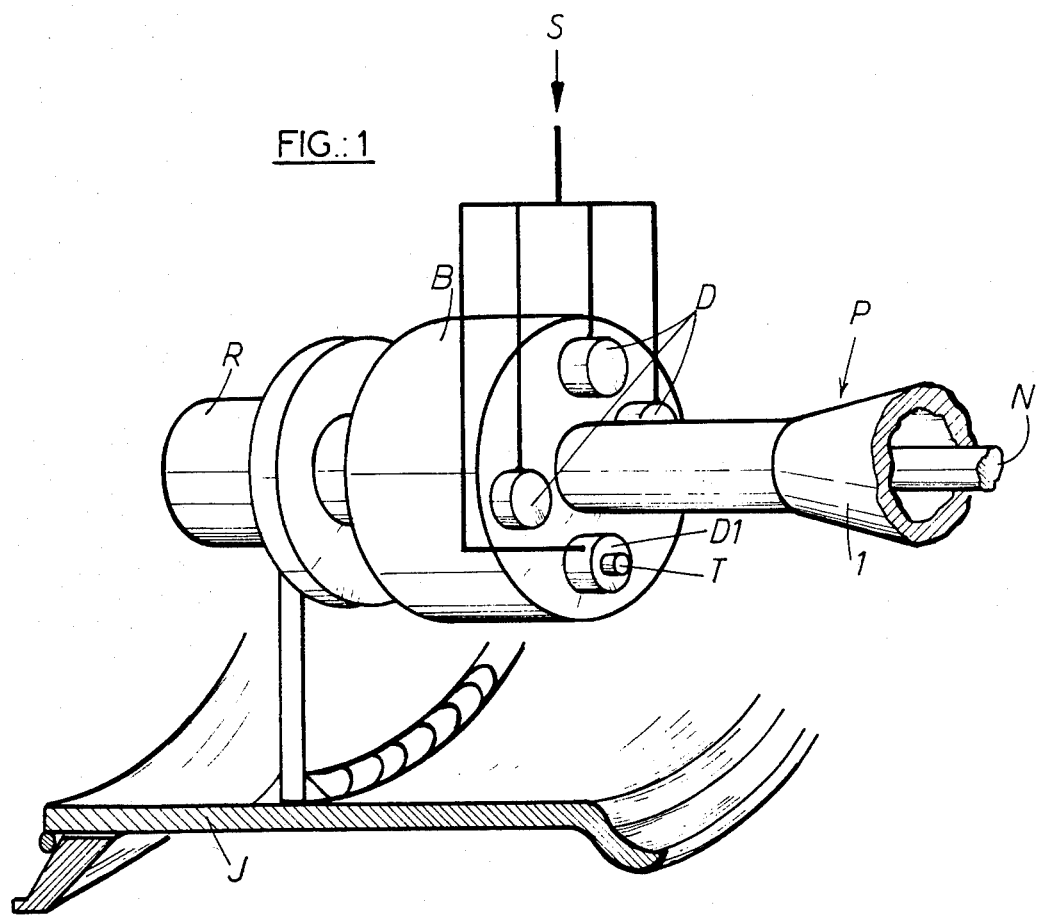

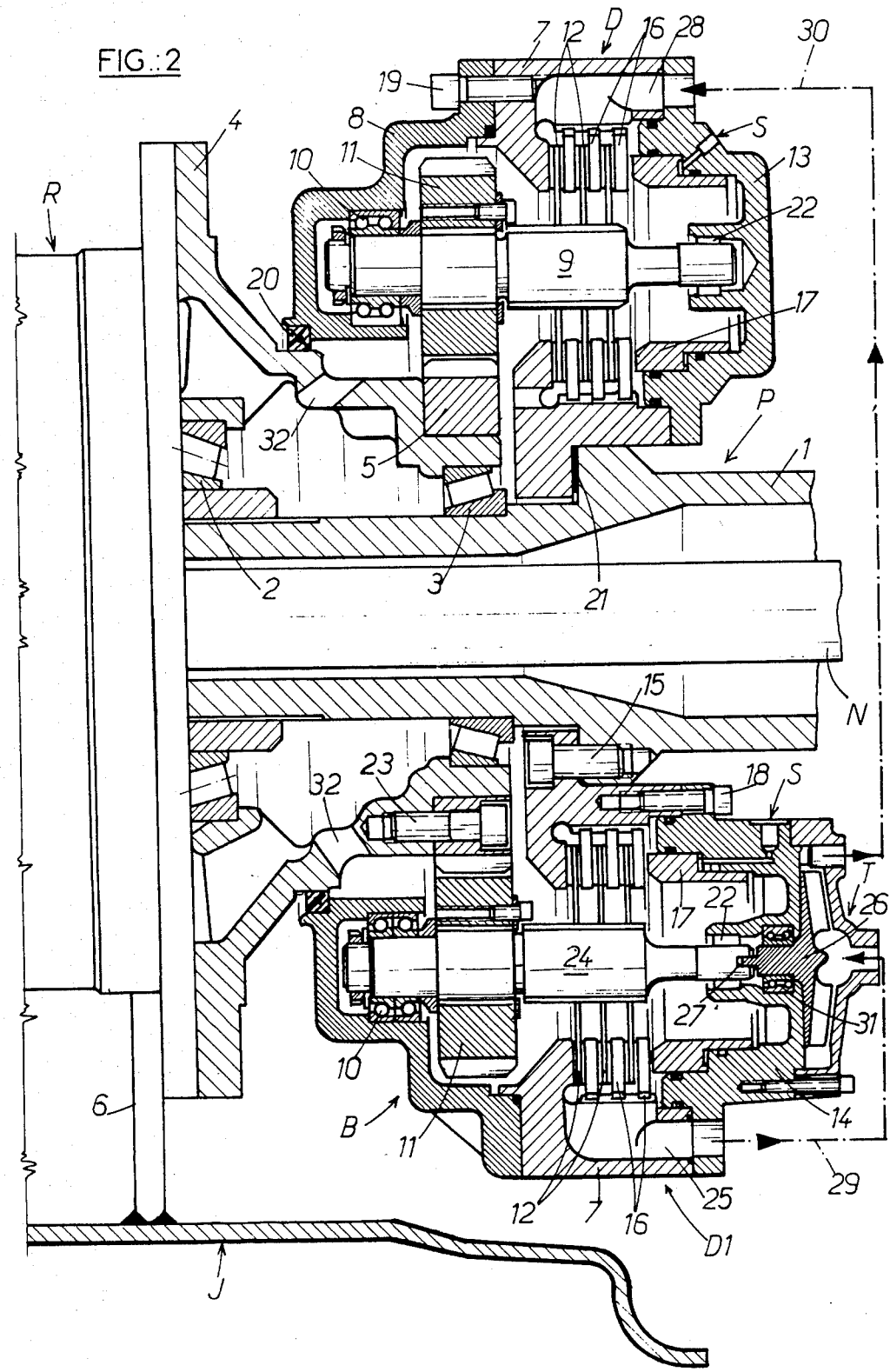
FIG.: 2

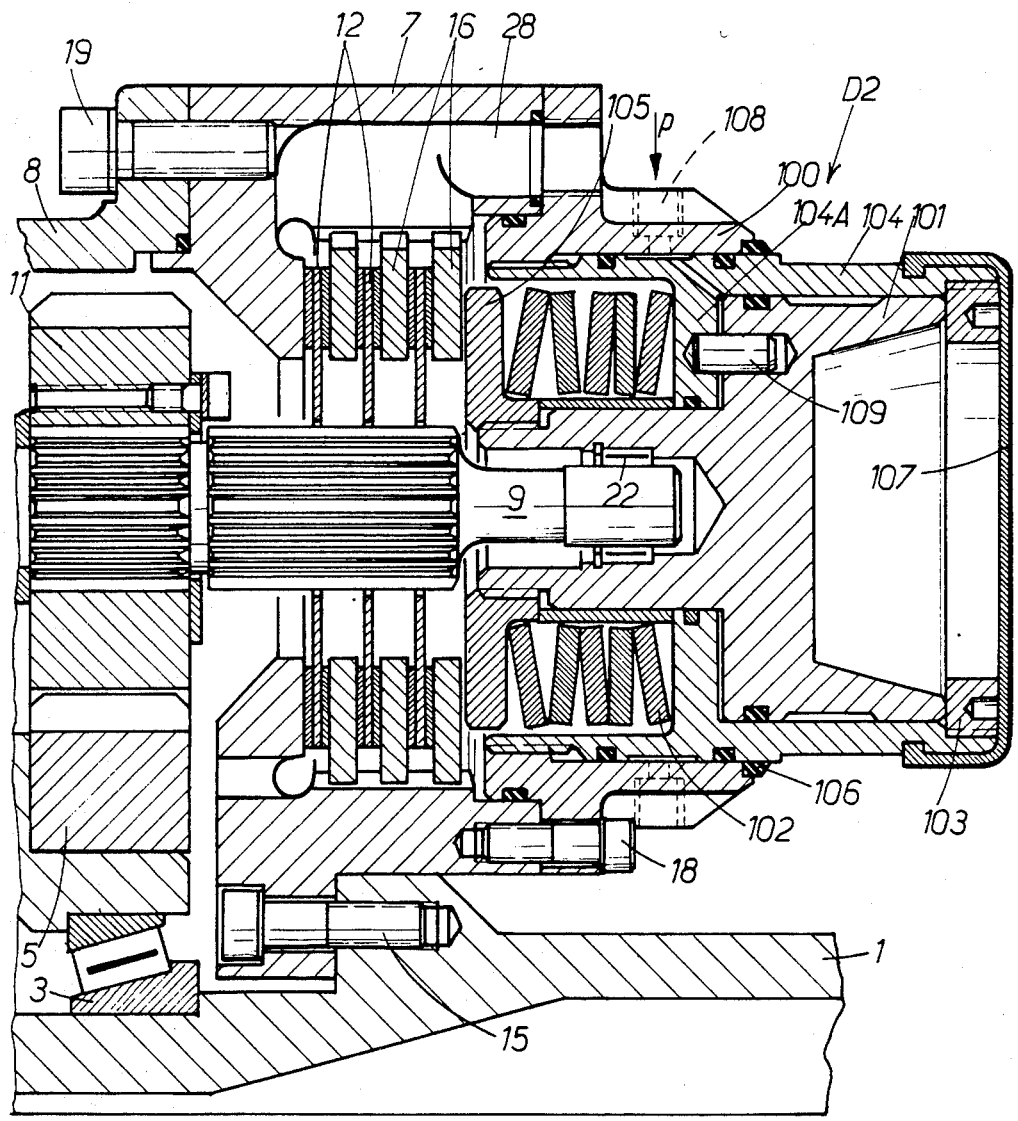
FIG.: 3

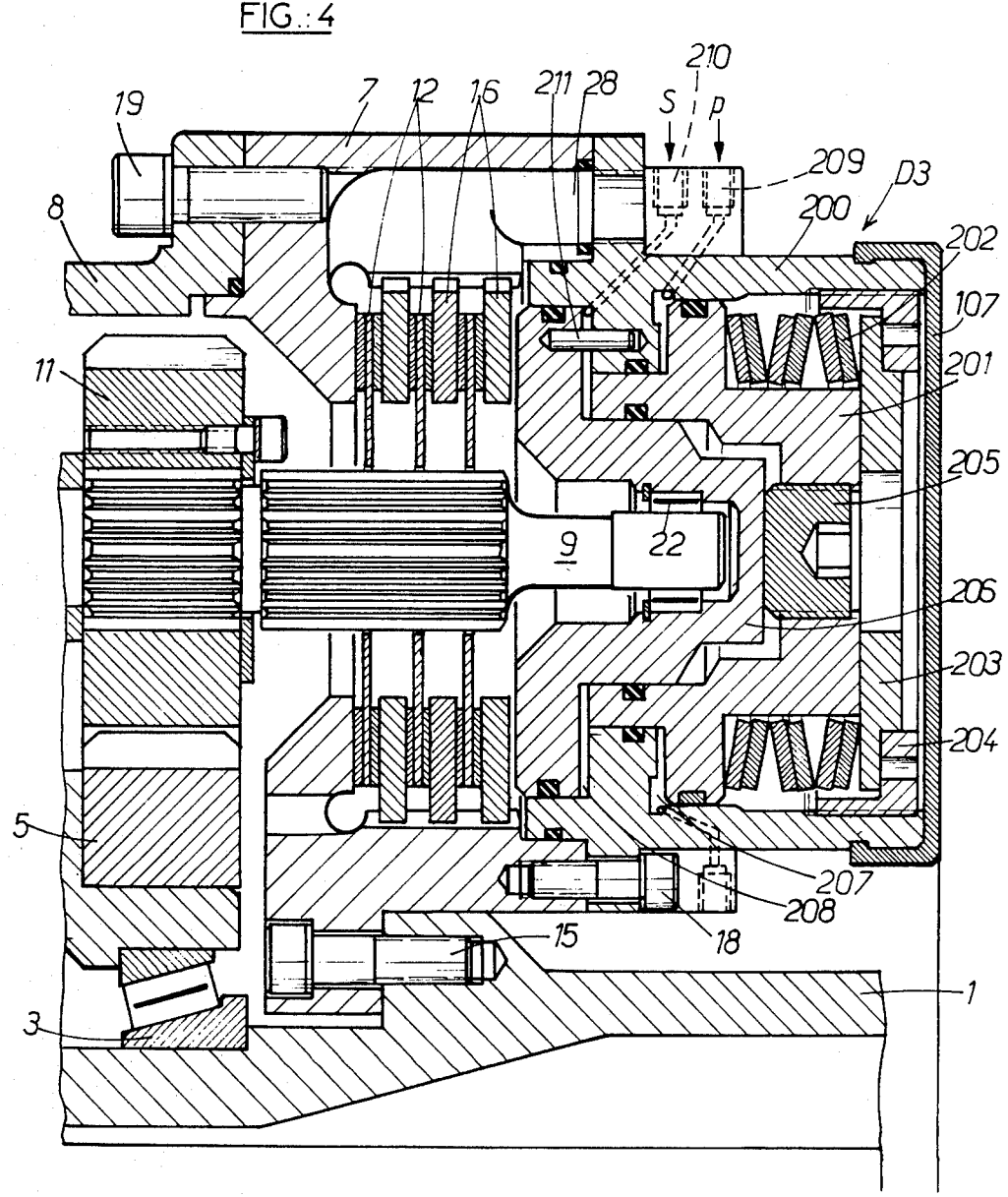
FIG.:4

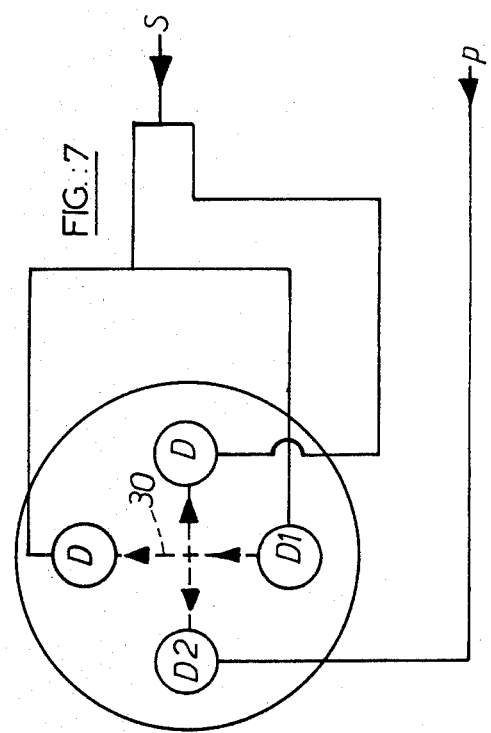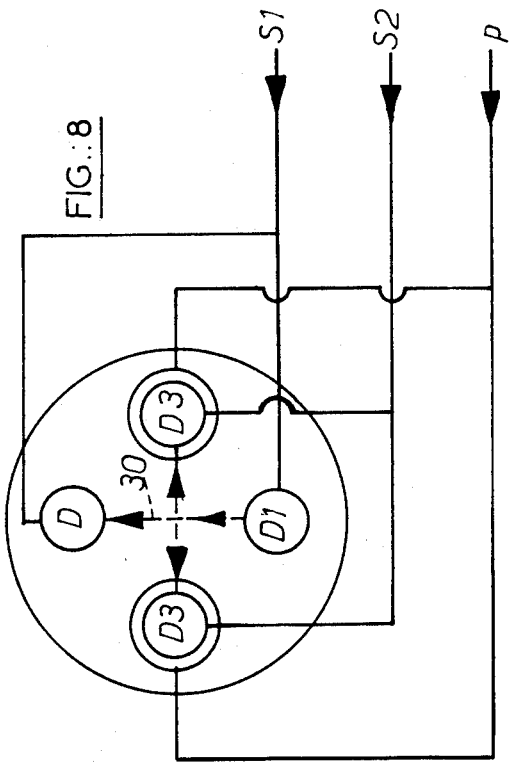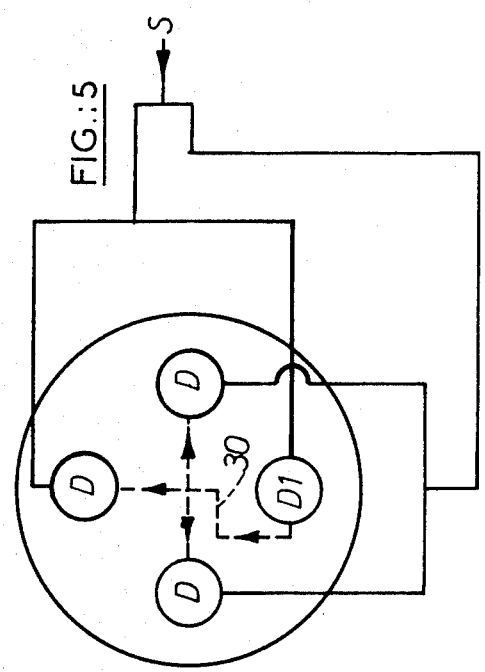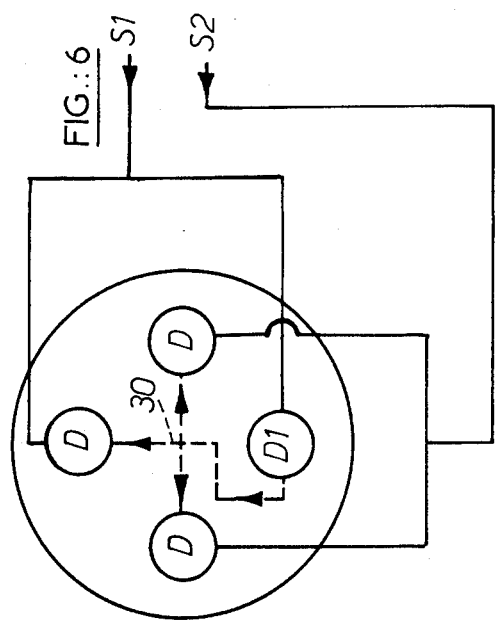

DISC BRAKE ASSEMBLY FOR VEHICLES WITH INTERCHANGEABLE BRAKE MODULES

This invention relates to heavy duty disc brakes for vehicles.

Wheels intended for use under heavy loads are at present provided with powerful brakes with multiple interleaved friction discs capable, under hydraulic control, of being clamped one against another so as to induce the friction required for effective braking, the heat generated by this friction being removed by a cooling liquid circulating in a closed circuit and immersing the friction discs. Further, in the transmission between the wheels and the friction discs is interposed speed-reducing gearing which, necessarily, is relatively complex and bulky, while the available space for housing it is small.

Such brake mechanisms, with multiple friction discs cooled by liquid and driven by speed-reducing gearing, are widespread and operate in an altogether satisfactory manner.

However, they cause grave technical problems of maintenance and repair as, to obtain access to the heart of the brake with a view to replacing a defective or worn component, one is obstructed by the speed-reducing gearing, which requires complicated and delicate operations for its disassembly and replacement. These problems are moreover made more acute when one is dealing with wheels that are of large dimensions and often very heavy, lending themselves ill to manipulation without specialised equipment and personnel. These jobs of maintenance and repair of the brake imply in addition long immobilisation of the equipment, and disturbance to the sealing of the hydraulic control of the brake.

The present invention enables these difficulties to be overcome thanks to a mechanical agency devised so as readily to enable convenient and direct access to be obtained to the heart of the disc brake, without requiring the removal either of the wheel or of any component of the speed-reducing gearing and without giving rise to any disturbance of the hydraulic control circuit.

In this regard, the present invention is related to the arrangements described in U.K. Patent Application No. 8110032 filed on the Mar. 31, 1981, but differs from it in that it procures further advantages in respect of the use of disc brakes in connection with wheels carrying heavy loads: the present invention in fact permits, on the one hand, the general pre-existing layout of the wheels relative to their speed-reducing gearing mechanism and, on the other hand, the avoidance of delicate operations in the drilling of ducts—in principle relatively long and straight—to provide the functional hydraulic connections of the brake.

According to the present invention there is provided a multi-disc vehicle braking apparatus, particularly for heavy duty applications, adapted to be mounted at the end of an axle of a vehicle inside a wheel rim thereof, adjacent to a speed-reducing gear disposed inside the rim, comprising a plurality of separate elementary modules each contained within an independent housing and operating by means of frictional engagement between a plurality of interleaved discs arranged to slide axially relative to one another under the action of a suitable gripping control, the discs being arranged furthermore to be cooled by a liquid circulating in a closed circuit.

As will be better understood from the following, such an arrangement, by its modular conception, permits adaptation of the control circuits to very varied demands, and this in a particularly flexible manner.

The invention is illustrated, by way of example only, in the accompanying drawings, of which;

FIG. 1 is a diagrammatical illustration of the general layout of a braking apparatus according to the present invention;

FIG. 2 is an axial section of an embodiment of the present invention;

FIG. 3 is an axial section of part of a second embodiment of the present invention;

FIG. 4 is an axial section of part of a third embodiment of the present invention; and FIGS. 5, 6, 7 and 8 are schematic diagrams of different control circuits for brakes for service, parking and security, readily permitted by the braking concept of the present invention.

As shown in FIG. 1, the assembled mechanism is mounted, in the usual way, inside a rim of a wheel J of a vehicle with speed-reducing gearing R situated at the end of an axle P comprising a drive shaft N housed within an axle tube, that is to say on the outer side of the wheel J.

In accordance with the present invention, on this same axle P, but on the inner side of the wheel J, is situated a braking assembly operating by means of a plurality of distinct elementary modules D—for example four in number, in the example illustrated—arranged in a circle in a block B mounted on the flared part 1 of the axle P, each module D being constituted by a housing for a brake, complete in itself and under integrated hydraulic control S.

In accordance with one advantageous embodiment of the present invention, one of the modules D, preferably that designated D1 and situated at the lowest level of the circular arrangement, will be equipped in addition with a circulating pump serving to cool the brake assembly, as shown in FIG. 2.

Thus the brake forming the subject of the present invention is disposed on the inside of the wheel J, leaving the reduction gearing R in its usual place: on the outside thereof. Further, the housing of each module D is closed by a removable cover giving, when it is removed, direct access to the stack of braking discs housed in the housing, without disturbing either the reduction gearing R or the hydraulic control systems of the brake. It is only requires the provision of covers of a diameter greater than that of the discs, for the latter to be able to be easily withdrawn or inserted through the wide openings thus revealed.

In the embodiment of FIG. 2, the flared part 1 of the vehicle axle P supports, through the intermediary of conical bearings 2 and 3, the nave 4 of the reduction gearing R on which is fixed a crown gear 5 as well as the disc 6 of the rim of wheel J.

Each modular disc brake device D, D1 comprises a housing having a fixed casing 7 attached to the flared part of the axle 1 by means of screw 15 and to which are fixed covers 13 and 14 by means of a screw 18. A cap 8 of the block B is centred and secured by screws 19 onto each of the casings 7. External sealing is ensured by an annular seal 20 and a flat annular seal 21.

The hydraulic control system S, actuated for example by the braking pedal of the vehicle, operates the pistons 17 of the brake housings D, D1 which further comprise a plurality of pad-carrying rotary discs 12 sliding in grooves of grooved shafts 9 and 24, and a plurality of fixed discs 16 sliding in grooves in the casing 7. Thus, when the hydraulic control system S operates, the pistons 17, the fixed discs 16 and the rotary pad-carrying discs 12 press against each other and against the casing 7.

The grooved shafts 9 and 24, centred by bearings 10 in the cap 8 and by bearings 22 in the covers 13 and 14, are caused to rotate by pinions 11 mounted on grooves in the shafts 9 and 24. The pinions 11 are driven in their turn by the toothed crown wheel 5 fixed on the nave 4 by screws 23.

The system for cooling the discs 12 and 16 of the housings D, D1 is constituted by conduits 25 and 28 formed in the casings 7, by external connecting tubes 29 and 30, and by a pumping assembly T using as cooling liquid the axle oil which is put into communication with the brake through openings 32 in the nave 4 and the bearing 3.

The pumping assembly T can be of any type: that shown is a turbo-pump system which draws the axle oil from the conduit 25 and the piping 29 by means of the turbine 26 centred in the cover 14 by a bearing 31 and driven by a coupling 27. The oil is discharged into the pipes 30 and conduits 28; it cools the fixed discs 16 and the rotary pad-carrying discs 12 of the other housings D, and returns to the axle through the openings 32 in the nave 4 and through the bearing 3. The circulation of oil inside the brake is enabled by the pump T not only during the braking action but also at other times. The oil circulating pump T is incorporated in the module D1 situated at the lowest level of the brake, below the level of the axle oil serving as a reservoir, so as to ensure its constant supply of oil.

It will be noted that the various disc brake module housings D, D1 which are disposed on the inner side of the wheel J, are accessible without the removal of either the latter or the reduction gearing R situated on the outside of the wheel J. The friction pads of the discs 12 can be changed following the removal of the covers 13, 14 this permitting free access to the braking discs; the removal by axial movement or replacement of the discs themselves is similarly facilitated.

It will also be noted that the modules D and D1 are essentially similar and interchangeable: the module D1 differs practically from the module D only in the substitution, for the simple cover 13 of the latter, of the more elaborate cover 14 which incorporates the circulating turbo-pump system T.

It is likewise possible to fit to the modules D other covers arranged with a view to providing accessory braking functions, as an alternative or in addition to the current function (referred to hereinafter as the service function).

Thus in particular, if one wishes to provide a brake for parking or for security (in the case of hydraulic circuit failure), the covers 13 shown in FIG. 2 are replaced by the variant incorporated into module D2, which is shown in FIG. 3, where the same reference numerals designate the same parts, and which is adapted as a brake with mechanical spring gripping action and released by hydraulic pressure.

In the embodiment shown in FIG. 3, the primary casing 7 of the basic housing has affixed thereto a secondary casing 100 provided with a connection 108 receiving hydraulic pressure p. In this secondary casing 100 is mounted a cylinder 104 integral with an annular flange 104A and provided with an end screw 103 forming a stop for the end of the travel of a piston 101 on the opposite end of which is screwed an annular collar 105. Between the two annular components 104A and 105, connected respectively with the cylinder 104 and the piston 101, are stacked ring-springs 102, the piston 101 being held against rotation relative to the cylinder 104 by a pin 109 fixed in the latter. However, the body of the braking module D2 is still constituted by the interleaved juxtaposition of rotary pad-carrying discs 12 and fixed discs 16. The operation of this module D2 is as follows:

When the pressure p is established in the hydraulic control system connected to the orifice 108, it pushes the piston 101 hard up against the screw 103, compressing the ring-springs 102 between the flange 104A of cylinder 104 and the collar 105, which serves to regulate the preloading of the ring-springs 102. The brake is thus free or ungripped. For operation, it is only necessary to cut off the pressure p between the piston 101 and the flange 104A, bringing about the gripping of the fixed discs 16 and the rotary pad-carrying discs 12, by means of the expansion of the resilient rings 102.

Play arising from wear of the system is taken up by screwing the cylinder 104 into the casing 100.

Sealing against dirt and moisture is ensured by a scraper ring 106 and a closure cap 107.

It will be noted that the operation of the brake by the module D2 requires a cessation of the hydraulic pressure p, whether deliberate (parking braking) or accidental (safety braking). On the other hand, the module D2 does not permit the service braking of the preceding modules D and D1 of FIG. 2 under the action of the hydraulic control system S.

If it is desired to provide the combination of functions of service braking on the one hand and parking or security braking on the other hand, another substitution can be made for the cover 13 of module D, in the form of module D3 shown in FIG. 4 where the primary casing 7 of the base housing has affixed thereto a secondary casing 200 provided with two connections 209 and 210 receiving the pressure p for parking and security respectively and a further connection for the operation of hydraulic control system S, the heart of the braking module still being constituted by the interleaving of rotary pad-carrying discs 12 and fixed discs 16.

When pressure for disengaging the parking brake is established between the piston 201 and the casing 200 by the hydraulic control system S connected to the orifice 209 in the chamber 207, the ring-springs 202 are compressed against the stop 203, itself bearing against the screw 204 providing the initial adjustment of the ring-springs 202. The parking brake is then freed.

The screw 205 serves to take up the operating play between the piston 206 and the fixed discs 16 and movable discs 12. The piston 206 slides in the casing 200 and also in the piston 201; it is held against rotation by a pin 211 positioned in the casing 200.

To operate the parking brake it is necessary merely to cut off the pressure p between 201 and 200, thereby actuating the interengagement of the fixed discs 16 and the rotary pad-carrying discs 12, by means of the expansion of the resilient rings 202.

On use of the brake in service, pressure is established in the chamber 208 by the action of the hydraulic control system S connected to the orifice 210, bringing about the displacement of the piston 206 which engages the fixed discs 16 and the movable pad-carrying discs 12, thus bringing about the deceleration of the vehicle.

It may be seen that the service braking function and the security and parking braking function are ensured by the same module D3 in a completely independent manner.

The modular concept of the brake described above enables its application to be adapted to various requirements of control circuits.

The layouts that will be described hereinafter are given by way of example, it being understood that any other combination that can be imagined comes within the scope of the invention when it is applied to the modular concept set forth above.

FIG. 5 shows a brake comprising four modules such as D, D1 under hydraulic control connected to a single hydraulic control system S of a known kind (as in the example of FIGS. 1 and 2), while FIG. 6 shows a brake of the same kind but with a double hydraulic braking circuit S1 and S2.

FIG. 7 shows a brake comprising three modules D, D1 under hydraulic control and a module D2 as shown in FIG. 3; the three former are connected to a hydraulic control circuit S while the module D2 is connected to receive hydraulic pressure p.

FIG. 8 shows a brake comprising two modules D, D1 under hydraulic control and two modules D3 as shown in FIG. 4. In the example illustrated, the four modules are operated by a double hydraulic control circuit S1 and S2, while the two modules D3 are additionally connected to receive hydraulic pressure p.

The embodiments described are merely examples and they can be modified, particularly by the substitution of technical equivalents, without departing from the scope of the invention.

I claim:

1. A brake assembly for a vehicle comprising a relatively stationary part, a hub comprising a mounting for a wheel journalled for rotation, and a wheel rim carried by said hub, wherein said brake comprises a plurality of angularly spaced elementary modules disposed within said wheel rim, each said module including brake-applying means wherein at least one of said modules has brake-applying means differing in construction from that of another of said brake-applying means, said construction being dependent on the braking function required and all of said brake-applying means being interchangeable with each other, each said module further comprising a housing mounted on said stationary part, a plurality of first and second interleaved discs axially slidably mounted within said housing, means keying said first discs to said housing, means coupling said second discs to said hub, and each said brake-applying means comprising means for urging said first and second discs axially into frictional engagement, each said housing comprising a casing and a cover detachably mounted on said casing, said covers corresponding in number to that of said modules, each said cover accomodating a respective brake-applying means for a respective module, and each said cover being interchangeable with a different cover accommodating different brake-applying means, according to the braking function required.

2. A brake assembly according to claim 1, wherein said casing comprises a member common to all said modules.

3. A combined live axle and brake assembly for a vehicle, wherein said live axle comprises a relatively stationary part including an axle tube, wheel bearings mounted on said axle tube, a hub comprising a mounting for a wheel journalled for rotation with respect to said axle tube on said bearings, a wheel rim carried by said hub, a drive shaft housed within said axle tube, and a speed-reducing gear for transmitting drive from said drive shaft to said hub, wherein said brake comprises a plurality of angularly spaced elementary modules disposed within said wheel rim, each said module including brake-applying means wherein at least one of said modules has brake-applying means differing in construction from that of another of said brake-applying means, said construction being dependent on the braking function required and all of said brake-applying means being interchangeable with each other, each said module further comprising a housing mounted on said stationary part, a plurality of first and second interleaved discs axially slidably mounted within said housing, means keying said first discs to said housing, means coupling said second discs to said hub, and each said brake-applying means comprising means for urging said first and second discs axially into frictional engagement, and wherein a supply of cooling liquid is provided for cooling said first and second discs of all said modules, and means are provided for circulating said cooling liquid in a closed circuit between all said modules, wherein each said housing comprises a casing and a cover detachably mounted on said casing, said covers corresponding in nmmber to that of said modules, each said cover accommodating a respective brake-applying means for a respective module, and each said cover being interchangeable with a different cover accommodating different brake-applying means, according to the braking function required.

4. Apparatus according to claim 3, wherein said axle tube has a flared part and a fixed block is mounted on said flared part of said axle, said modules being arranged in said fixed block in a ring.

5. Apparatus according to claim 3, wherein said speed-reducing gearing is situated on the outer side of said rim of said wheel and said braking modules are disposed on the inner side thereof.

6. Apparatus according to claim 3, wherein a circulating pump is incorporated into said cover of one of said modules, said closed circuit comprising ducting means provided in the braking apparatus, said cooling liquid being circulated around said closed circuit by means of said circulating pump.

7. Apparatus according to claim 6, wherein lubricating oil is provided within the axle tube and said module with said circulating pump is disposed below the level of said oil of said axle tube.

8. Apparatus according to claim 3, wherein said cover of one of said modules is equipped with a pusher for the control of said braking discs, said pusher, operated by a spring, being normally maintained by hydraulic pressure in a position effecting release of said discs with said spring loaded, the operation being such that said pusher comes to an active position for engaging said discs under the action of said spring in the event of the cessation of the hydraulic pressure.

9. Apparatus according to claim 8 further comprising an hydraulic control actuated by the driver of the vehicle and independent of the hydraulic pressure, wherein said cover of one of said modules is arranged so that said pusher passes from its position effecting release of said discs to its active position for engaging them under the action of said hydraulic control.

10. Apparatus according to claim 3, wherein said casing comprises a member common to all said modules.

* * * * *